United States Patent [19]
Greene et al.

[11] Patent Number: 5,765,797
[45] Date of Patent: Jun. 16, 1998

[54] ARTICULATED SUPPORT FOR COMPUTERS AND THE LIKE

[76] Inventors: H. Peter Greene, 31 S. Main St., Schwenksville, Pa. 19473; John J. Rizzi, 7 Bradley Rd., Weston, Conn. 06883; Matthew J. Ransil, 317 Fairmount Ave., Apt. 112, Jamestown, N.Y. 14701

[21] Appl. No.: 571,159

[22] Filed: Dec. 12, 1995

[51] Int. Cl.$^6$ .................................................. F16M 13/00
[52] U.S. Cl. ................................... 248/398; 248/923
[58] Field of Search ........................... 248/398, 371, 248/397, 917, 922, 923

[56] References Cited

U.S. PATENT DOCUMENTS

| | | |
|---|---|---|
| D. 275,431 | 9/1984 | Usab . |
| D. 311,392 | 10/1990 | Hillary et al. . |
| D. 330,892 | 11/1992 | Hassel et al. . |
| 3,321,165 | 5/1967 | Wann . |
| 3,820,752 | 6/1974 | Oram . |
| 4,365,561 | 12/1982 | Tellier et al. . |
| 4,453,687 | 6/1984 | Sweere . |
| 4,562,987 | 1/1986 | Leeds et al. . |
| 4,616,798 | 10/1986 | Smeenge et al. . |
| 4,635,893 | 1/1987 | Nelson . |
| 4,657,214 | 4/1987 | Foster ................................. 248/176 |
| 4,695,024 | 9/1987 | Haven . |
| 4,708,312 | 11/1987 | Rohr . |
| 4,717,112 | 1/1988 | Pirkle . |
| 4,768,744 | 9/1988 | Leeds et al. . |
| 4,779,922 | 10/1988 | Cooper . |
| 4,834,329 | 5/1989 | Delapp . |
| 4,836,478 | 6/1989 | Sweere . |
| 4,836,486 | 6/1989 | Vossoughi et al. . |
| 4,915,450 | 4/1990 | Cooper . |
| 4,988,066 | 1/1991 | Cotterill . |
| 5,040,760 | 8/1991 | Singer ................................. 248/284 |
| 5,041,770 | 8/1991 | Seiler et al. . |
| 5,088,676 | 2/1992 | Orchard et al. . |
| 5,098,053 | 3/1992 | Cotterill . |
| 5,123,621 | 6/1992 | Gates . |
| 5,199,773 | 4/1993 | Price, Jr. et al. . |
| 5,322,025 | 6/1994 | Sherman et al. . |
| 5,339,749 | 8/1994 | Hirose . |
| 5,351,897 | 10/1994 | Martin . |
| 5,405,204 | 4/1995 | Ambrose . |
| 5,501,420 | 3/1996 | Watt et al. ........................ 248/280.11 |

Primary Examiner—Ramon O. Ramirez
Assistant Examiner—Willie Berry, Jr.
Attorney, Agent, or Firm—Michael de Angeli

[57] ABSTRACT

An articulated support for a display including a base having a fore-to-aft slide assembly located proximate a rear portion of the base, a primary support for supporting the display, and having a pivot glide assembly depending from a rear portion of the primary support received within the fore-to-aft slide assembly for simultaneous translation and rotation therein, and a linkage assembly pivotally interconnecting the primary support to a forward portion of the base such that when the forward portion of the primary support is moved vertically, the primary support is simultaneously rotated and translated at a predetermined, synchronous rate with respect to the vertical translation of the forward portion of the primary support to automatically adjust the display as the user's viewing position changes vertically.

49 Claims, 7 Drawing Sheets

ARTICULATED SUPPORT FOR COMPUTERS AND THE LIKE

BACKGROUND OF THE INVENTION

The present invention relates generally to furnishings for electronic data processing equipment and the like, and in particular to an adjustable device for supporting computer displays and/or keyboards.

Systems or assemblies which are adapted to adjust the height or orientation of a display commonly associated with computers generally fall into two basic categories. The first are dedicated systems which for the most part occupy a permanent or semi-permanent place in a workstation, while the second are add-on systems to existing workstations.

Dedicated systems are often built into a desk or table top support structure designed to stand alone, or as part of an entire workstation. An example of one such system, U.S. Pat. No. 5,322,025, discloses a worksurface support for electronic data processing equipment comprising a free standing pedestal, a generally U-shaped first worksurface for supporting a keyboard thereon, and a second worksurface to support a display. The keyboard worksurface is vertically adjustable with respect to the floor, and the display worksurface is vertically adjustable separate and apart from the keyboard worksurface. A disadvantage associated with furniture systems is that they require dedicated floor space in the workstation. A workstation not originally equipped with such a unit would need to be reconfigured or partially disassembled to add the unit to the workstation. Additionally, furniture systems are large, often heavy, and require substantial manpower to move.

Add-on systems were designed to adapt any workstation to accommodate a display. In general, many systems, such as disclosed in U.S. Pat. No. 4,562,987, were intended to support a computer terminal for use by several workers at their regular work place. In general, the support included a multi-segmented swivel arm attached to a centrally located post. The swivel arm cantilevered the computer terminal at one end of the arm while the other end pivoted about the post. Variations of the swivel arm supports are attached to the wall, such as disclosed by U.S. Pat. No. 4,695,024. Generally, all of the second category of supports suspend the computer display or other display above the worksurface. A significant disadvantage associated with table or wall-mounted cantilevered supports is that they are not easily moved. The systems must be detached from the table or wall and reattached to the new location. Additionally, because of the often long swivel arm and the swivel connections, the computer display and peripherals must be removed from the support to make handling of the support more manageable. Furthermore, such a system is intended to be used by a number of users sitting around the display.

In general, both categories of prior systems provide relatively minor adjustment. That is to say, that they are designed for users who are either standing or sitting. For a single user who has adjusted the system, the user may remain in that position or posture substantially during the entire work period. However, it has been found that an employee is more productive, and healthy, when able to assume different postures throughout the work day. None of the prior systems provide the flexibility to appropriately position the display when in a sitting position as well as when in a standing position. Moreover, none of the prior systems allow the user to address the system in a variety of postures, for either portable or stationary worksurfaces.

SUMMARY OF THE INVENTION

One aspect of the invention is to provide an articulated support for computer terminal displays and the like which is capable of being used on substantially any worksurface and allows the user to simultaneously change the height of the keyboard and the orientation of the display to accommodate the user in a sitting, standing, or intermediate positions. The articulated support comprises a base supported at a predetermined height on a surface and includes a fore-to-aft slide assembly proximate a rearward portion of the base and a pivot assembly disposed toward a forward portion of the base. A primary support, configured to support a display thereon, includes a pivot glide proximate a rearward portion of the primary support and received within the slide of the base for rotation and fore-to-aft translation therein. The primary support is interconnected to the base such that when the forward portion of the primary support is translated vertically to accommodate different user positions, the rearward portion of the primary support is translated horizontally to rotate the primary support and maintain user visibility of the display.

According to another aspect of the invention, the primary support is rotated at a predetermined, synchronous rate with respect to the vertical translation of the forward portion of the primary support to automatically adjust the display as the user's viewing position shifts vertically. The rearward portion of the primary support is translated horizontally an amount sufficient to avoid interference between the display and any vertical surface adjacent the rear of the base.

According to yet another aspect of the invention, the support is constructed to aid the user in changing the orientation of the primary support and in retaining the articulated support in a selected position. A counterbalance mechanism is operably positioned between the base and the primary support to assist the user in vertically translating the forward portion of the primary support. The counterbalance mechanism also assists in maintaining a selected position of the articulated support. A brake assembly is provided which is automatically activated once the articulated support is positioned to fix the position of the primary support.

A further aspect of the invention provides a secondary support connected to the forward portion of the primary support for supporting a data input device thereon. The secondary support is also connected to the link in such a manner such that the angular orientation of the secondary support with respect to the base is substantially constant with a vertical translation of the forward portion of the primary support.

Another aspect of the invention is to provide an articulated support for computer displays and the like, comprising a base adapted to be supported at a predetermined height and including a fore-to-aft slide adjacent a rearward portion of the base, and a pivot positioned adjacent a forward portion of the base, and a primary support for supporting the display including a pivot guide positioned adjacent a rearward portion of the primary support and rotatably received within the slide of the base for actual rotation and fore-to-aft translation therein. A connector is provided for detachably supporting the display on the primary support adjacent the forward portion thereof, such that the display and the primary support move in unison. Also provided is a means for operatively connecting the primary support with the base such that when the forward portion of the primary support is shifted upwardly to accommodate different user positions, the rearward portion of the primary support is translated forwardly to rotate the primary support and maintain the user visibility of the display.

Additional aspects of the invention include a secondary support pivotally coupled to the primary support which is adapted for supporting a data input device thereon, which is maintained at a predetermined angular orientation with respect to the base and to properly position the data input device at the appropriate height for the user when the primary support is shifted to accommodate different user positions. Furthermore, the invention provides that the primary support is rotated at a predetermined synchronous rate with respect to the vertical translation of the forward portion of the primary support to achieve automatic adjustment of the display as the user shifts between different vertical positions.

According to yet another aspect of the invention, a desktop sit/stand support is provided for computers and the like, comprising a base adapted to be abuttingly supported on an existing work surface with a primary support adapted for supporting a display thereon. The primary support includes a rearward portion pivotally connected with the base, and a connector for detachably supporting the display on the primary support adjacent a forward portion thereof. The primary support and a display resting thereon move; in unison between a sitting position, wherein the display is oriented for convenient viewing by an adjacent seated user, and a standing position wherein the display is oriented for convenient viewing by an adjacent standing user. The desktop sit/stand support further includes a secondary support adapted for supporting a data input device thereon, and being connected with the primary support for movement therewith between the sitting and standing positions, such that the primary support is shifted from the sitting position to the standing position by pivoting the primary support about the rearward portion thereof with respect to the base. As the primary support pivots, it elevates the position of the forward portion of the primary support and the display thereon, as well as the secondary support and the data input device, and contemporaneously rotates the primary support to maintain user visibility of the display in a standing position.

According to other aspects of the invention, it includes a linkage assembly pivotally interconnecting the primary and secondary supports to the base for rotating and translating the primary support with respect to the base, while simultaneously sustaining an angular orientation of the secondary support with respect to the horizontal plane. A counterbalance is further provided which interconnects the linkage assembly to the base to partially support the primary support in a selected orientation and to aid the user in articulating the primary support between the various positions.

In yet another aspect of the invention, a vertically adjustable support for computers or the like is provided, comprising a base adapted to be supported at a predetermined height and including a fore-to-aft slide positioned adjacent a rearward portion of the base; a primary support for receiving a display thereon and including a pivot glide positioned adjacent a rearward portion of the primary support and rotatably received within the slide of the base for axial rotation and fore-to-aft translation therein. A connector is provided for supporting the display on the primary support adjacent the forward portion thereof such that the display and the primary support move in unison. A secondary support is also provided for supporting a data input device thereon. The secondary support is connected to the primary support for movement therewith, such that the primary support can be readily adjusted to accommodate different vertical positions of the user by pivoting the primary support about a rearward portion thereof with respect to the base. Pivoting of the primary support raises and lowers the position of the forward portion of the primary support and the display thereon, as well as the secondary support and the data input device, and contemporaneously rotates the primary support to automatically maintain the user visibility of the display.

According to one other aspect of the invention, an articulated display for computers and the like is provided comprising a base including a fore-to-aft slide adjacent a rearward portion and a pivot adjacent a forward portion, a pivot glide positioned adjacent a back portion of the display and rotatably received within the slide of the base for axial rotation and fore-to-aft translation therein, and a link having one end connected with the pivot on the base, and an opposite end connected with the base at a location spaced apart from the pivot glide, such that when a forward portion of the display is shifted upwardly to accommodate different user positions, the rearward portion of the display is translated forwardly to rotate the display and maintain user visibility of the display.

The principal objects of the present invention are to provide an articulated computer support which is versatile, portable and economical. The advantages provided by this invention include the ability to change the height of the keypad and the angular orientation of the display with respect to the user on a truly portable support, which may be located on substantially any type of existing or new worksurface. Additionally, the invention easily accommodates substantially any posture assumed by the user. It has been found to be beneficial that workers change their posture several times during the work day. The invention provides the benefits of changing posture. Such a support also permits a single station to be easily used and viewed by a person sitting on a chair, on a tall stool, or standing. The portability and adjustability of the support permits a wide range of uses, including in offices, hospital nursing stations, customer services windows or counters, airline ticket counters and the like.

BRIEF DESCRIPTION OF THE DRAWING FIGURES

FIG. 1 generally illustrates a workstation environment with two articulated computer supports embodying the present invention shown in different configurations to accommodate the posture of user;

DETAILED DESCRIPTION OF THE PREFERRED EMBODIMENTS

Figure 1:
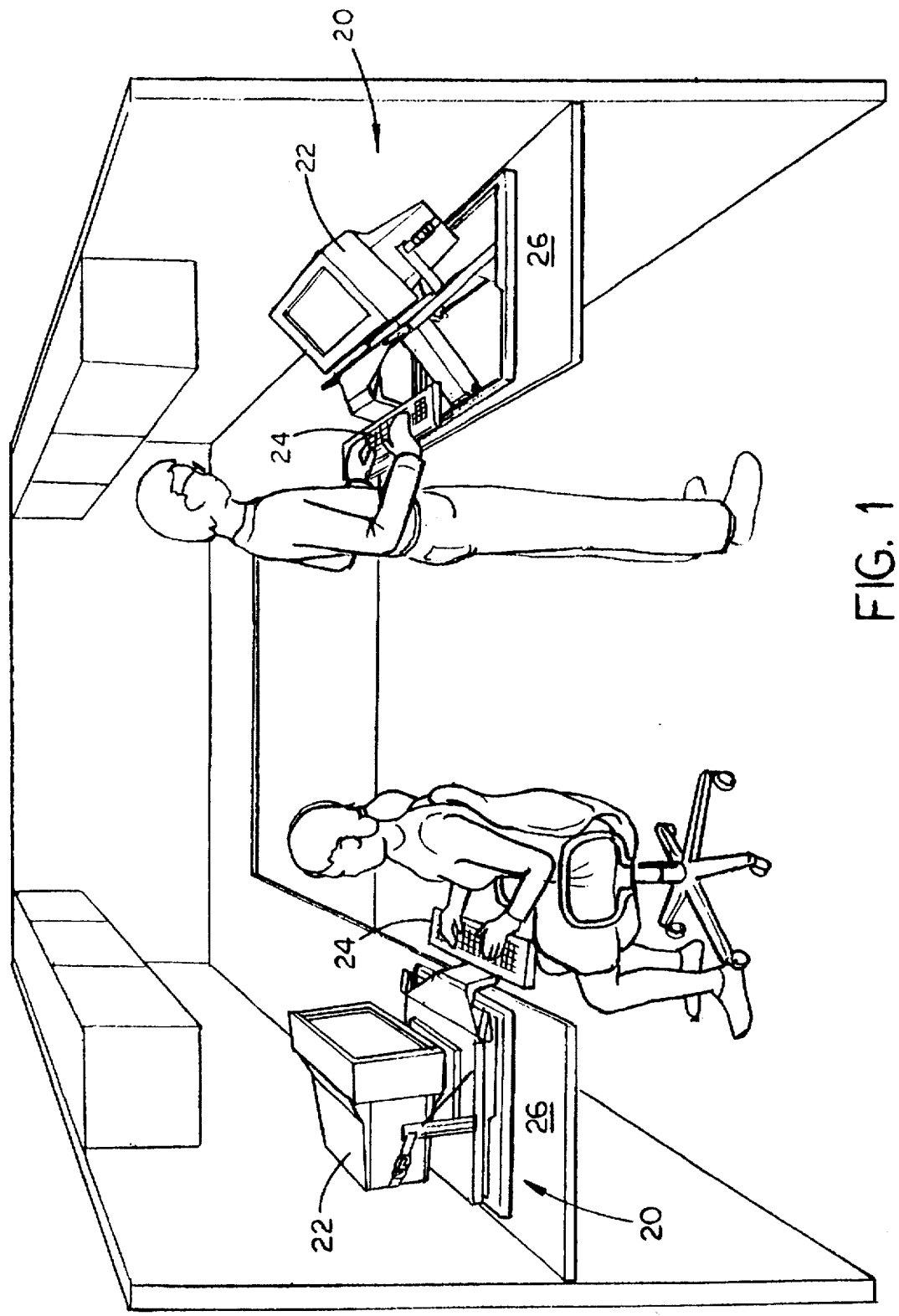

For purposes of description herein, the terms "upper," "lower," "right," "left," "rear," "front," and relative terms thereof shall refer to the invention as addressed by a user facing the invention as shown in FIG. 1. However, it is to be understood that the invention may assume various alternative orientations and configurations, except where expressly specified to the contrary. It is also to be understood that the term "worksurface" shall refer to desk and table tops, counter tops, tops of credenzas, cart, rolling workshop, mobile or stationary, or related surfaces where a person may locate or place a video display and associated data input devices, such as a keyboard, a mouse, or the like, including personal computers, electronic cash registers, remote stations of a computer network, or related systems. Moreover, although the following description is directed to a portable articulated support, it is contemplated that the invention may also be permanently located on a worksurface or built into a worksurface to provide a dedicated support.

The reference numeral 20 (FIG. 1) generally designates an articulated support for computer displays and the like, which in the illustrated structure is in the form of an articulated computer support 20 supporting a display 22 and associated data input device 24 such as a keyboard and/or mouse on a worksurface 26 at a desired orientation, depending upon the position of the user. For example, support assembly 20 located on surface 26 in the left hand portion of FIG. 1 illustrates display 22 and keyboard 24 oriented in a lowered or retracted configuration for use when an operator is seated. The display 22 is oriented generally horizontally and the keyboard 24 is lowered such that a person in a seated position can easily and comfortably use the keyboard as well as view the display 22. If necessary and depending upon the desire of the user, support 20 may be reconfigured quickly and easily to reposition the display 22 and keyboard as shown in the right hand portion of FIG. 1. In this configuration, the user may be standing or sitting on a stool, which requires that the keyboard 24 be extended or elevated to the appropriate height, and the display rotated such that the operator can view the entire screen from the elevated position.

Figure 2:
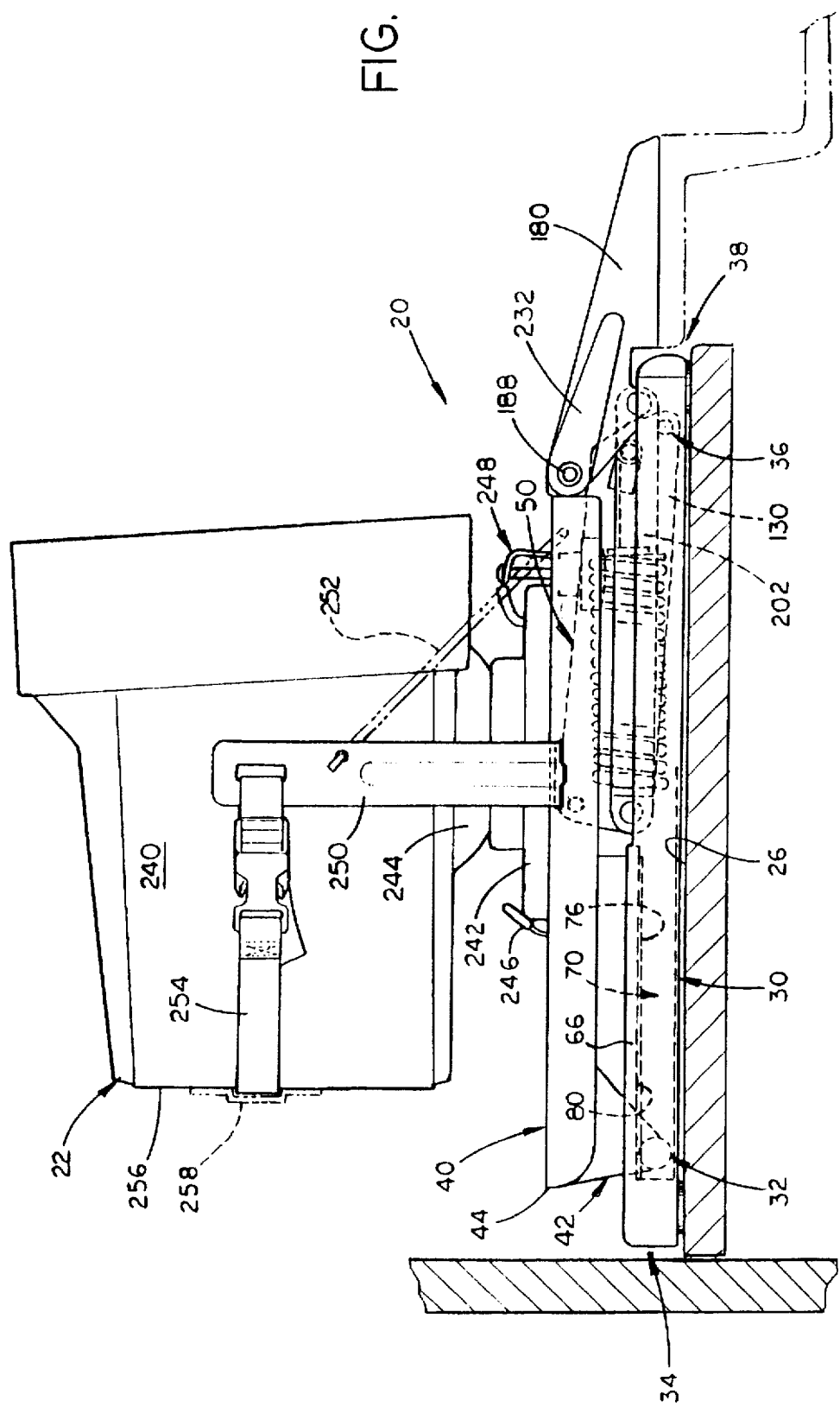
FIG. 2 is a side view of the articulated computer support shown in a retracted configuration.
Figure 3:
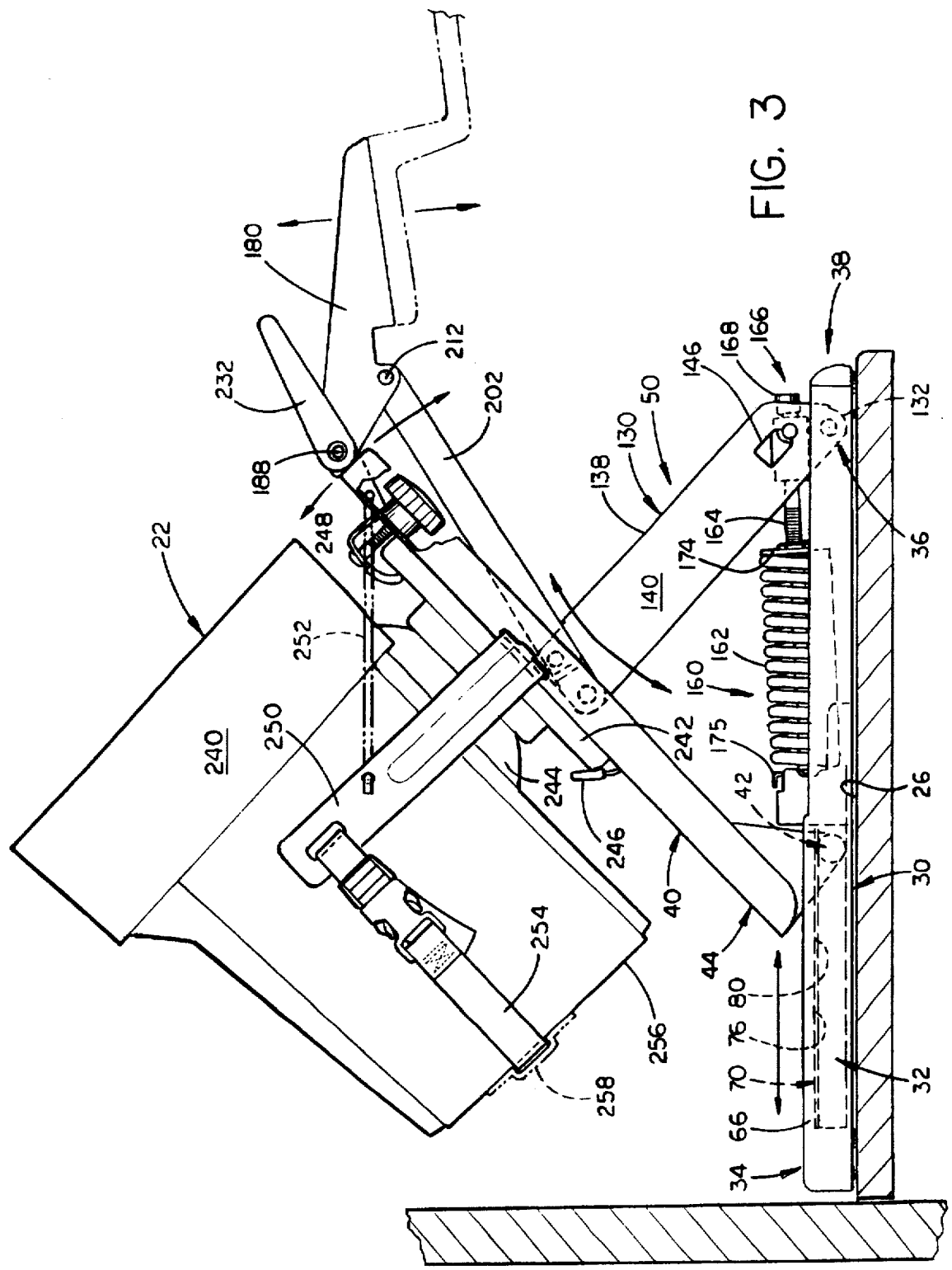
FIG. 3 is a side view of the articulated computer support shown in an extended configuration.

Referring to FIGS. 2 and 3, reference numeral 20 generally designates an articulated assembly for supporting displays and the like. Articulated support 20 is particularly adapted for use on worksurfaces, such as desk tops, table tops, bench tops, counter tops, and the like. The articulated support 20 includes a base assembly 30 for resting on the worksurface 26 having a fore-to-aft slide 32 located adjacent a rearward portion 34 and a pivot 36 located adjacent forward portion 38 of the base. A primary support 40 is disposed above base assembly 30 and includes a pivot glide 42 located adjacent a rearward portion 44 which is rotatably received within the slide 32 for axial rotation and fore-to-aft translation therein. A linkage assembly 50 is provided which interconnects primary support 40 with base assembly 30 such that when the forward portion 38 of primary support 40 is translated upwardly to raise the keyboard 24 and tilt the display 22, the rearward portion 44 of primary support 40 is translated horizontally toward the forward portion 38 of base assembly 30 to rotate primary support 40 about a pivot point with the linkage and maintain user visibility of the display.

In the illustrated example (FIGS. 4 and 5), base assembly 30 comprises a base plate 60 of generally rectangular shape and preferably made from a sheet of metal, such as ⅛ inch thick aluminum or other commercially acceptable material. Attached to opposite sides 62, 64, of plate 60 and extending substantially the length thereof are siderails 66, 68, each having a generally C-shaped configuration to define a channel or slide 70 oriented inwardly toward the central portion of the plate 60. Siderails 66, 68 are interconnected by a rear rail 74 attached to the back edge 72 of base plate 60, which has substantially the same cross-sectional profile and inward orientation as siderails 66, 68. Disposed in each side rail 66, 68, proximate the rearward portion 34 of base plate 60, is a rack 76 dependent from an inside surface 78 of upper wall 80. Rack 76 has a predetermined length, and is configured to engage a gear as more fully described below.

Primary support 40, also called a platform or deck, is also generally rectangular in form in conformance with base plate 60, and is also preferably made from sheet metal, such as ¼ inch aluminum or other commercially acceptable material. Deck 40 includes a front or leading edge 102, sides 82, 84, and a rear edge 44. Sides 82, 84 of deck 40 may define a skirt 86 formed by edges 82, 84 being bent downwards at approximately 90 degrees or by angled brackets extending the length of the deck. Skirt 86 is configured to partially conceal components located between base plate 60 and deck 40 and to provide a finished look. Slightly inboard from skirt 86 and depending from the lower surface 88 of deck 40 are a pair of axle brackets 90, 92, each preferably located proximate rearward edge 44 and secured thereto. Each axle bracket 90, 92, although of any shape, is preferably triangular in form with a flange along one edge attached to the deck. Also depending from the bottom surface 88 of the deck, and located generally in the central portion of the deck, is a U-shaped bracket 94 wherein the bottom wall 96 of bracket 94 is attached to the bottom 88 of the deck. Flanges 98, 100 of bracket 94 extend from opposite ends of the bottom wall 96 generally at a right angle to the deck. Also depending from the bottom surface 88 of deck 40 at a forward edge 102 are at least two keyboard brackets 104, 106, each spaced equidistantly and generally on opposite sides of a centerline running the length of the deck (see FIG. 9). Brackets 104, 106 as well as flanges 108, 110 extending from each bracket extend a predetermined distance beyond the boundary of the deck defined by the forward edge 102, for reasons which will be more apparent below.

Figure 5:
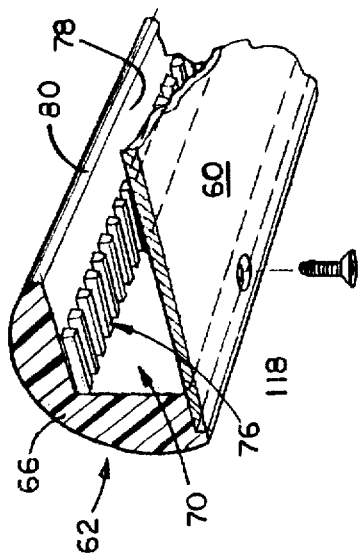
FIG. 5 is a fragmentary perspective view of a fore-to-aft slide of the articulated computer support.
Figure 6:
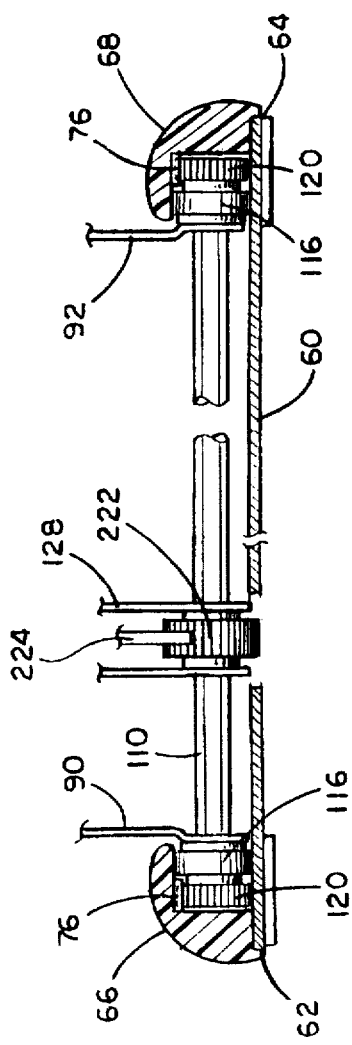
FIG. 6 is a fragmentary front view of a pivot glide of the articulated computer support.

As mentioned above, rearward portion 44 of deck 40 is in sliding relationship with the rearward portion of channels 70 by way of pivot glide 42 (see FIGS. 5–6). Glide 42 comprises an axle 110 extending through and journaled in the brackets 90, 92. The opposite ends 112 and 114 of the axle 110 are disposed in opposite channels 70 of each side rail 66, 68, respectively, with each having a wheel 116 inboard of each rack 76 and adapted to engage the floor or bottom wall 118 to bear the weight of the deck thereon. Outboard of each wheel 116 and mounted on axle 110 is a pinion gear 120, each configured to engage rack 76 in each channel 70. The rack and pinion 70, 120 at each end 112, 114 of axle 110 insure linear parallel travel or translation of each wheel 116 in channels 70 to keep axle 110 square to base 30 without binding. The rack and pinion 70, 120, respectively, also insures that deck 40 will translate substantially parallel to base assembly 30. Although a rack and pinion pivot glide mechanism is described, it is contemplated that other means may be used to allow translation of the rear edge of deck 40 with respect to base 30. It is envisioned that sliding shoes or skids or other bearing structures may be attached to the ends of axle 110, which are constrained or otherwise guided to provide horizontal translation as well as pivotal movement of the rear of the deck.

Deck 40 is also pivotally coupled to base plate 60 by linkage assembly 50 briefly described above. In particular, linkage assembly 50 includes a lower channel member 130 having one end 132 pivotally coupled to a yoke member 134 attached to the forward portion 38 of the base 30, with a second end 136 pivotally coupled to the U-shaped bracket 94 on the central underside 88 of deck 40. Lower channel member 130 rotates deck 40 upwards and causes the rear edge of the deck to translate from back to front when the leading edge 102 of the deck is raised. In a preferred embodiment, channel member 130 includes a central wall or web 138 interconnecting sidewalls or flanges 140 extending the length thereof and oriented substantially perpendicular to central web 138. The first end 132 of the lower channel member includes a pair of holes 144, 146 extending through the sidewall flanges 140, wherein hole 144 is preferably located proximate end 132 and offset from central web member 138. Hole 146 is preferably located inboard of hole 144 and is provided to receive one end of a counterbalance assembly 160 described below. Hole 144 provides the pivotal coupling of the channel member 130 to the base 30 by way of a pin (not shown) passing through yoke member 134. The opposite end 136 of the lower channel member 130 also includes a pair of holes 150, 151. Hole 150 provides the pivotal coupling of end 136 to bracket 94 attached to the underside 88 of the deck 40. Hole 151 is provided slightly inboard of hole 150 and spaced from web 138 for reasons described below. It is also contemplated that other structures or means may be used in place of channel member 130 to provide a rotary motion to primary support 40, including scissor linkages, interconnecting the deck and base, or camming mechanisms such as sliding wedges or the like. Another option is a planetary gear assembly or similar structure connected with pinion gear 120 or gear 222 which can be used to promote rotation of deck 40.

Figure 8:
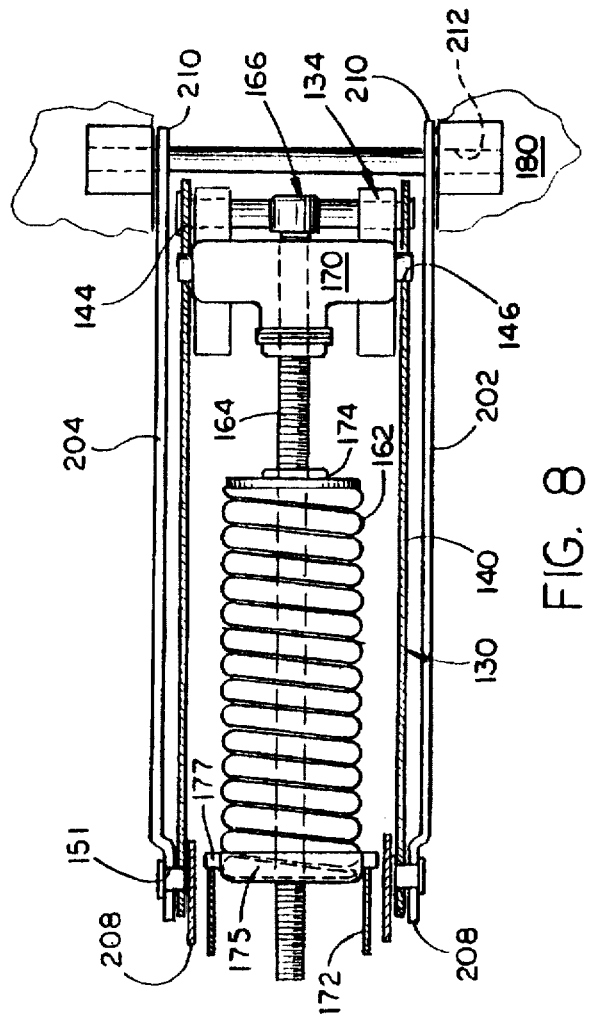
FIG. 8 is a fragmentary plan view of a counterbalance of the articulated computer support.

To maintain the inclined position and orientation of deck 40 at any set location between and including the fully extended and fully retracted positions, and to assist the user in raising the deck 40 (FIGS. 2 and 3), linkage assembly 50 includes a counter-balance assembly 160. In one embodiment, counterbalance assembly 160 interconnects the lower channel member 130 to the base plate 60. In particular, counterbalance assembly 160 includes a compression spring 162 concentrically mounted along a shaft 164 of a hex head 166. Hex head 166 has one end 168 captured in a T-shaped yoke 170 (FIG. 8) which, in turn, is captured or retained in pivotal relationship in hole 146 in sidewall flanges 140 of the lower channel member 130. The opposite end of the shaft 164 passes through a passage in a coupler block 172 rigidly fixed to the central upper surface of base plate 60. A washer or disc 174 is fixed along shaft 164 and is configured to engage one end of the compression spring 162. The opposite end of the compression spring 162 is captured by a cap 175 which contains opposing pins 177 configured to rest within notches or cradles 179 (FIG. 4) in the coupler block 172 to allow shaft 164 and spring 162 to pivot about the pins 177 and to center the spring on the shaft. Cap 175 also provides a surface upon which the spring may act when compressed. The force exerted by compression spring 162 on lower channel member 130 and thus deck 40 can be adjusted by rotating the cap screw 166 using a conventional hex wrench; and changing the length of the spring 162 between block 172 and washer 174. It is preferred that the force produced by spring 162 range between 0 and 100 pounds, and most preferably range between 15 and 70 pounds. The amount of force exerted by counterbalance spring 162 may also be adjusted by changing the coupling point 146 of the counterbalance assembly to the lower channel member 130. For example, by moving coupling point 146 inwardly along the length of the channel member toward end 136, higher forces will be exerted in the lower extensions of the deck. Conversely, lower forces will be exerted by coupling the counterbalance spring closer to end 132 of the lower channel member 130. Instead of counterbalance spring 162, another means of partially supporting the weight of the deck 40 and display 22 is by way of a member having a compressed fluid such as a gas-filled shock absorber or similar device. Additionally, one-way governors, connected by cables wrapping around axle 110 may be used to partially support the weight of the deck 40 and display 22 when being lowered. The governor would not be engaged when the deck is elevated.

Figure 9:
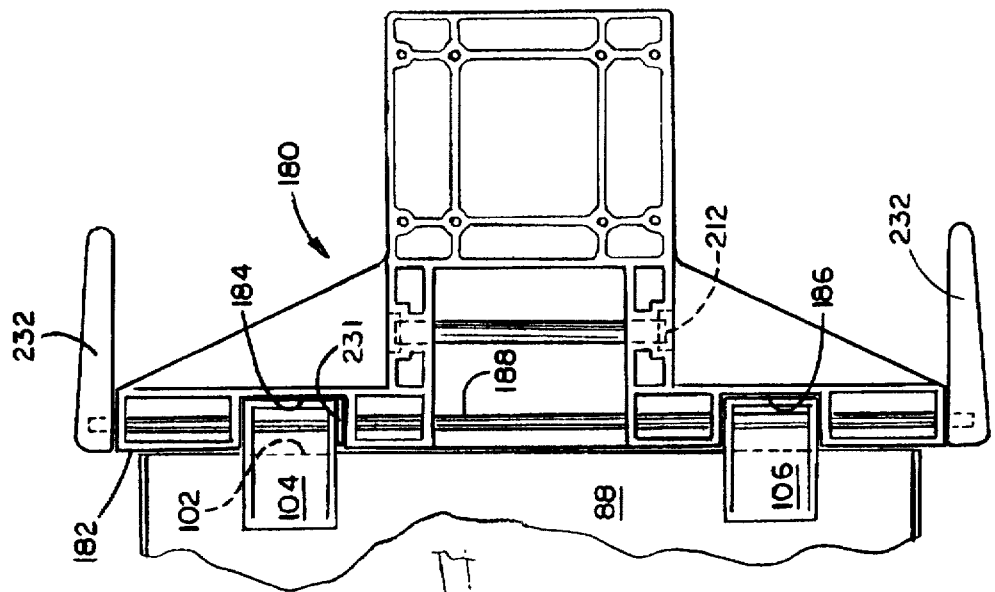
FIG. 9 is a fragmentary bottom plan view of the secondary support of the articulated computer support.
Figure 7:
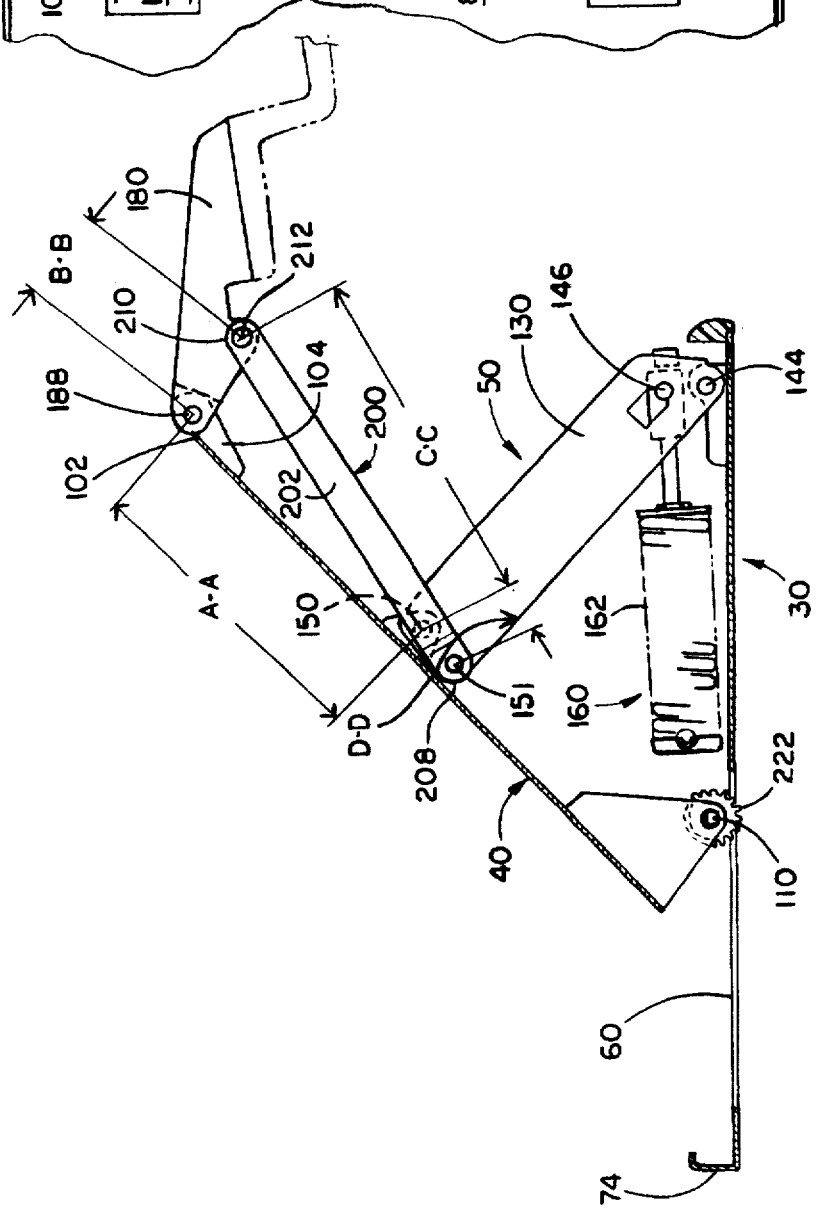
FIG. 7 is a fragmentary view of the link of the articulated computer support.

Referring to FIGS. 7 and 9, the forward or lending edge 102 of deck 40 is interconnected to a secondary support 180, such as keyboard support assembly configured to receive a wide range of data input devices, such as keyboards and/or mouse devices. More specifically, it is contemplated that secondary support 180 have one edge 182, configured to lie adjacent leading edge 102 of deck 40, including two recesses 184, 186 (FIG. 9) defined therein, each configured to receive one of the keyboard brackets 104 or 106 described above, extending from the leading edge 102. It is preferred that secondary support 180 be pivotally coupled to deck 40 by a rod or hinge pin 188 passing through secondary support 180 parallel to edge 182 and through openings (not shown) in the keyboard brackets. In order to prevent the secondary support 180 from swinging like a pendulum from its pivot coupling with the keyboard brackets and to provide a substantially constant orientation of secondary support 180 with respect to base assembly 30, a bar assembly 200 is provided which pivotally interconnects secondary support 180 directly to point 151 on lower channel member 130 described above. Bar assembly 200 comprises a pair of bars 202, 204, (see FIG. 4) each having a hole 206 at opposite ends 208, 210. Ends 208 are configured to be pivotally coupled by a pin or other fastener (not shown) extending through holes 206 and holes 151 defined in the lower channel member 130. The opposite end 210 is pivotally coupled through hole 212 in the secondary support below the pivotal coupling by rod 188. The lines identified as A—A, B—B, C—C, and D—D (FIG. 7) and interconnecting the coupling points between the various members essentially define a four-bar linkage configuration which allows generally constant orientation of secondary support 180 with respect to the base assembly throughout the range of rotational orientations of deck 40. The distance between bar members 202, 204 is greater than the width of central web 138 of lower channel member 130 such that bars 202, 204 can nest with the upper half of the lower channel member 130 when the deck is in its fully retracted position. Alternatively, a cable, rope, strap, or other means may be coupled to secondary support 180 at one end, and to the rear portion of base 30, in a manner such that the length of the cable remains substantially constant over the rotation range of the deck. The fixed length of cable will maintain the angular orientation of the secondary support with respect to the deck 40 over substantially the entire range of deck rotation.

Figure 4:
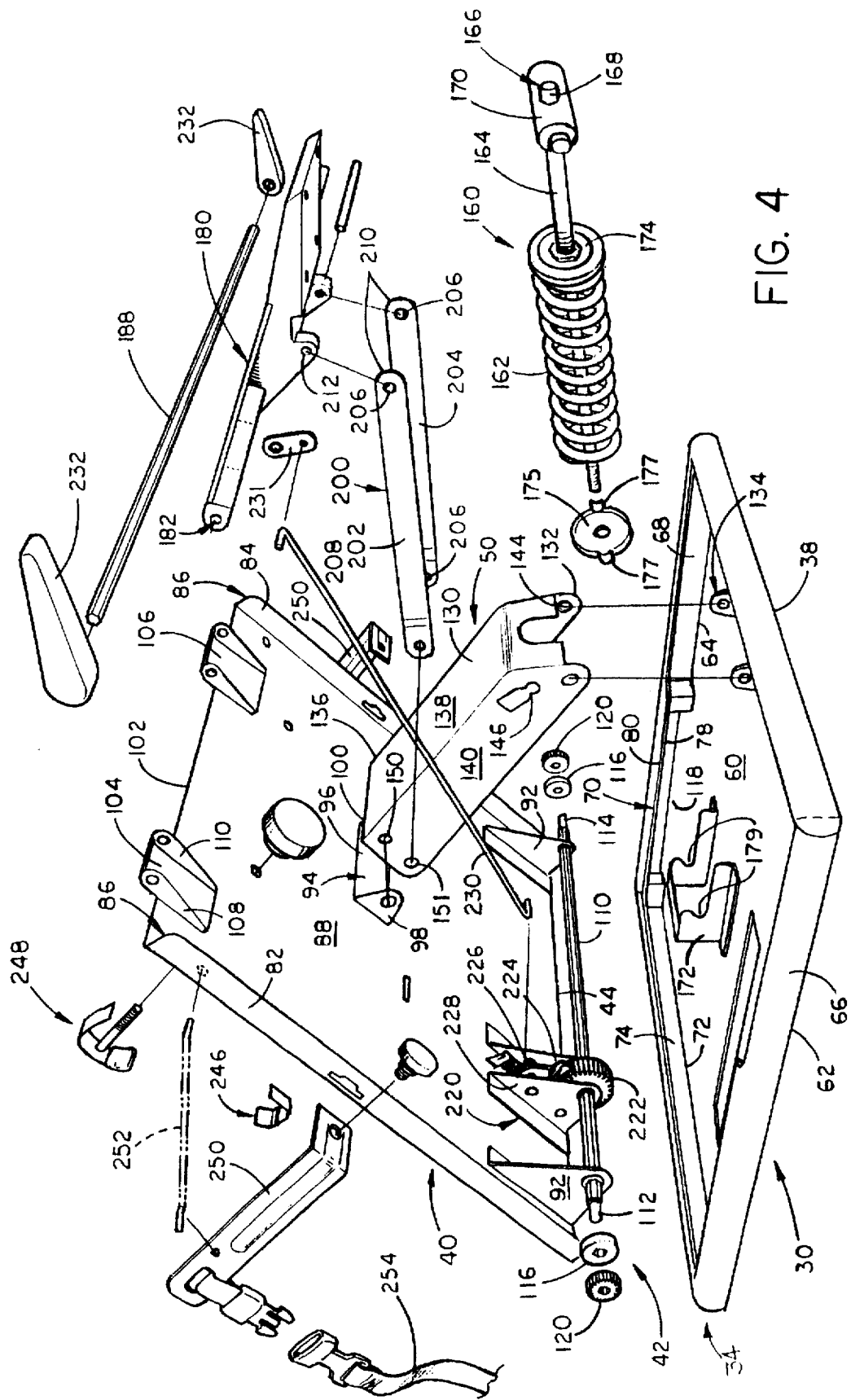
FIG. 4 is an exploded view of the articulated computer support.
Figure 10:
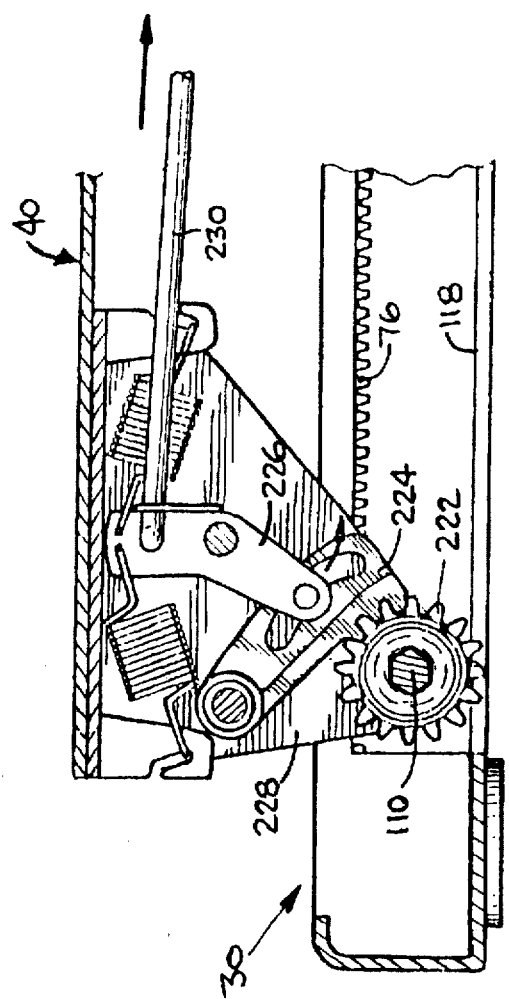
FIG. 10 is a fragmentary section view of the brake assembly of the articulated computer support.

As seen in FIGS. 4 and 10, the positions of deck 40 and secondary support 180 are maintained by a brake assembly 220 attached the lower surface 88 of deck 40. The brake assembly 220, when on, prevents axle 110 from rotating, thus preventing back-and-forth translation of the rearward portion 44 of deck 40 along rails 66, 68. With the brake assembly 220 in the "off" position, the user may raise or lower the leading edge 102 of the deck 40 to the desired position. In particular, brake assembly 220 comprises a gear 222 fixed about the shaft of axle 110 such that rotation of the axle also rotates gear 222. In a preferred embodiment, gear 222 has up to twice as many gear teeth than exist on pinion gears 120. Engaging one or more teeth of gear 222 is a pawl, escapement, finger, or similar device 224 urged into contact with gear 222 to prevent the rotation thereof. Although pawls or escapements are specifically mentioned herein, other structures or devices may be used to engage gear 222 to prevent the rotation of axle 110 in either direction and hereinafter these devices will generally be referred to as a "pawl". Pawl 224, in turn, may be moved out of engagement with gear 222 by a crank 226 pivotally coupled by a bracket or housing 228 to the bottom of deck 40. In a preferred embodiment, crank 226 is pivotally coupled to one end of a linkage rod 230 which, in turn, is pivotally coupled at its opposite end to a crank 231 depending from hinge rod 188 coupling secondary support 180 to the leading edge 102 of deck 40. Crank 231 and secondary support hinge pin 188 may be rotated in either direction by handles 232 attached to opposite ends of hinge pin 188 extending beyond the lateral margins of the deck 40 and secondary support 180. Raising or lowering of one or both handles 232, depending upon the direction of movement of deck 40, rotates hinge pin 188 and crank 231. Rod 230 transfers this movement to crank 226, which then disengages pawl 224 from gear 222, allowing axle 110 to rotate pinion gears 120 and wheels 116, 118 along the slide 70 defined by rails 66 and 68. Release of the handles re-engages pawl 224 with gear 222 and locks the unit in place. Another means of fixing the angular orientation of deck 40, other than the brake assembly described above, includes one or more pair of brake shoes located on opposite sides of wheels 116. For ease of use, the brake shoes may engage wheels 116 automatically. A positive action such as rotating a handle would disengage the shoes, allowing the rear of the deck 40 to translate.

The articulated support 20 described above is intended to support a display device such as 22 (FIG. 2) at substantially any inclined orientation between the horizontal and 45 degrees above horizontal. It is contemplated that display 22 may include computer displays, such as cathode ray tube displays, liquid crystal displays, or any other display carried or contained within a housing or the like. Display 22 may be a separate device, as is the case with many personal computers, or may constitute an integral part of a package, such as occurs in specialty applications. Typically, display 22 includes a housing 240 supported above a base 242 typically through a universal coupling 244 which permits adjustment of the housing about both horizontal and vertical axes. In one embodiment, display base 242 is retained on the upper surface of deck 40 by a bracket 246 along the back of the base, and by one or more clamps 248 threadably secured through deck 40. In addition, housing 240 is contemplated to be supported by a pair of brackets 250, each of which is secured to deck 40 on opposite sides of the display housing 240, and extending upwards alongside the display. Each bracket 250 may be braced with respect to deck 40 by a rod 252 having one end secured to deck 40 proximate the leading edge 102 and the second end anchored near an upper end of each bracket. The back of the display 22 may also be supported by an adjustable webbing 254 which extends around the rear of the display 256 and interconnects the pair of brackets 250. Webbing 254 may be captured to the back of the display by a plate 258 to prevent the webbing from sliding off the display.

In one working embodiment of the present invention, it is contemplated that the articulated support 20 be located on the worksurface 26 which may have a height ranging between 28 and 48 inches above the floor, although the specific height of the worksurface 26 may be higher or lower. The articulated support 20 preferably has a low profile with a height of the primary support 40 above the worksurface 26 in a retracted position ranging between 2 and 5 inches, and most preferably about 3 inches. The footprint of the articulated support is preferably as small as functionally possible in order to conserve space of the worksurface. In the working embodiment, the base may have a length ranging between 18 and 26 inches and a width ranging between 12 and 18 inches. Most preferably, the length is about 22 inches and the width is about 16 inches. In the retracted position, the dependent secondary support 180 locates the keyboard or other data input device 24 at a comfortable elevation for a person sitting at the worksurface. With the articulated support 20 in the retracted position, it is preferred that the display 22 mounted to the deck 40 be located or positioned at a height such that the attached display 22 is approximately at eye level of the user, presently contemplated to range between 36 and 60 inches above the floor, but dependant greatly on the physical stature of the user.

The articulated support 20 is designed to provide a wide range of adjustment to accommodate the user. Assuming that articulated support 20 rests on worksurface 26 having a height of 30 inches above the floor, a person of more than 72 inches in height would have to bend down to view the display 22 and to reach the keyboard. However, the standing user can raise the leading edge of the primary support 40 by pulling up on handles 232 until the display is oriented at the desired elevation. As the leading edge 102 of the primary support 40 is elevated one inch, the primary support 40 rotates display 22 at a synchronous rate ranging between 2 and 6 degrees, preferably between 3 and 5 degrees, and most preferably at a rate of approximately 3.5 degrees. In the working embodiment, primary support 40 preferably has a maximum rotation range of about 40 degrees, and most preferably about 45 degrees. With a synchronous rotation rate of about 3.5 degrees per inch, and given the dimensions provided above, an overall vertical travel distance of about 12 inches for the leading edge 102 of the primary support is achieved.

In use, it is preferred that articulated support 20 be located on the desired surface of the workstation, either before or after the display 22, keyboard 24, or other peripheral equipment is attached. Although a generally horizontal worksurface is preferred, the invention can also be located on an inclined surface such as a tilted drafting or engineer's table. The manner in which the primary support or deck 40 moves permits the back of the assembly to be placed directly against or in close proximity to a divider wall at the back of the worksurface without fear that the display will contact the divider when the deck is tilted.

If it is desired to orient display 22 horizontally, and deck 40 is not already in a fully collapsed configuration, the operator or user need only push down on one or both handles 232 in order to disengage the brake assembly 220 from axle 110. Downward pressure on the handles 232 counteracts the force exerted upon deck 40 by counterbalance assembly 160 and the leading edge 102 of deck 40 lowers. Simultaneously with the lowering of deck 40, the rear edge 44 translates from front-to-back under the aid of wheels 116 and pinion gears 120 moving within the guides 70 defined by siderails 66, 68. The wheels 116 bear a portion of the load of deck 40 and display 22 while pinion gears 120 engaging racks 76 insure linear and smooth translation. As a result of the four-bar type linkage (lines A—A, B—B, C—C, and D—D) interconnecting the secondary support 180 with deck 40, the orientation of the secondary support 180 with respect to the worksurface or base is maintained as it is lowered with the deck. Conversely, if the user desired to elevate or tilt the display 22 and raise the secondary support to suit his particular need, the user need only lift upon the handles 232 to disengage brake assembly 220 from the axle 110. Continued upward pressure on the handles 232 is applied by the operator to lift the leading edge 102 of the platform 40. The upward movement of the deck or platform 40 is assisted by the counterbalance assembly 160, thus reducing the amount of work needed to raise the unit. As the deck 40 rotates upwardly, the rear edge 44 translates toward the forward edge 38 of base 30. This results in a shifting of the center of gravity of the deck 40 and attached monitor 22 backwards away from the attachment point of the counterbalance. The shifting of the center of gravity, together with the assistance of the counterbalance, results in less work to lift the deck and keyboard support, making it easier to orient the display. Once at the desired elevation/orientation, the user simply discontinues the upward force and releases the handles 232 to engage the brake assembly 220 on the axle. If the deck 40 springs off of the base assembly 30 too rapidly, and requires considerable effort to retract the deck 40 against base assembly 30, the compression spring 162 on counterbalance 160 is most likely compressed too tight. The force exerted by compression spring 162 may be reduced by rotating cap screw 166 to move washer 174 and lengthen the spring 162. This adjustment is continued until the desired operation is achieved. The reverse procedure is conducted if it requires considerable effort to extend deck 40 and/or deck 40 drops when brake 220 is released.

The advantages provided by this invention are numerous and include providing a versatile system for readily adapting a display for substantially any work space environment without the need to retrofit the work space. Today, many work spaces are multi-purpose or the demands of the work space change with time. With this invention, any workstation having conventional desk top height worksurfaces can be quickly altered to serve users who are standing a good portion of the time. If the user decides to sit and interact with the display system, the display may be lowered for use. The result is that the user can change his or her working position readily and conveniently, relieving fatigue, and reducing injury and discomfort due to repetitive stress caused by working long periods in a single position. An added advantage provided by this invention is a system which may be quickly reconfigured to properly position the display and keyboard at a fraction of the cost of the more expensive systems which require a dedicated space in the workstation environment. Moreover, this invention also provides greater versatility and adaptability to the work space since the articulated support may be located on substantially any worksurface, mobile or stationary.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. An articulated support for computer displays, comprising:

a base adapted to be supported at a predetermined height, and including a slide positioned adjacent a rearward portion of said base for permitting fore-to-aft sliding motion of an associated glide, and means defining a pivot point for an associated link positioned adjacent a forward portion of said base;

a primary support adapted for supporting a display thereon, and including a glide positioned adjacent a rearward portion of said primary support and received within the slide of said base for fore-to-aft translation therein, and means at a location spaced apart from said glide defining a pivot point for an associated link; and a first link having one end thereof pivotally connected to said means for defining a pivot point on said base, and an opposite end thereof pivotally connected with said means defining a pivot point on said primary support, wherein said glide permits rotation of said primary support about an axis parallel to the plane of said fore-to-aft motion permitted by said slide, and parallel to the pivot axes of said link defined by said pivot points, such that when the forward portion of said primary support is shifted upwardly to accommodate different user positions, the rearward portion of said primary support is translated forwardly to rotate said primary support and maintain user visibility of the display.

2. An articulated support as set forth in claim 1, including a counterbalance mechanism operably positioned between said base and said primary support to retain said articulated support in its selected position.

3. An articulated support as set forth in claim 2, wherein said link is positioned so as to rotate said primary support at a predetermined synchronous rate with respect to the vertical translation of the forward portion of said primary support to achieve automatic adjustment of the display as the user shifts between different vertical positions.

4. An articulated support as set forth in claim 3, wherein said synchronous rate is in the range of 2 to 6 degrees of rotation per inch of vertical translation.

5. An articulated support as set forth in claim 4, wherein said link is positioned to shift the forward portion of said primary support along a generally vertical plane, so as to maintain optimum eye-to-display spacing between the display and the user as the user shifts between various vertical positions.

6. An articulated support as set forth in claim 5, wherein said link is positioned to translate the rearward portion of said primary support forwardly an amount sufficient so as to avoid interference between the display and any vertical surface disposed adjacent the rearward portion of said base.

7. An articulated support as set forth in claim 6, wherein:
said slide positioned adjacent a rearward portion of said base for permitting fore-to-aft sliding motion of an associated glide includes a pair of track members positioned along opposite sides thereof; and
said glide comprised by said primary support includes a pair of glides positioned along opposite sides thereof and received in said track members.

8. An articulated support as set forth in claim 7, wherein said primary support further includes means extending laterally across the rearward portion of said primary support, connecting said glides for substantially simultaneous parallel movement with respect to said track members.

9. An articulated support as set forth in claim 8, wherein:
said track members include toothed racks; and
said means extending laterally across the rearward portion of said primary support comprises a rod supported for axial rotation with respect to said primary support, and toothed pinions mounted on opposed ends of said rod and intermeshed with said racks to insure parallel fore-to-aft translation of said primary support in said base.

10. An articulated support as set forth in claim 2, wherein said counterbalance mechanism exerts force between said base and a medial portion of said first link between said opposite ends thereof.

11. An articulated support as set forth in claim 1, including a secondary support for supporting a data input device thereon.

12. An articulated support as set forth in claim 11, wherein said secondary support is mounted to said primary support by linkage ensuring that the secondary support moves along a predetermined arc as the primary support is lifted upwardly.

13. An articulated support as set forth in claim 12, wherein said linkage is a four-bar linkage defined by a second pivot point on the primary support, a second pivot point defined by said first link, a second link pivoted at one end to the first link at said second pivot point defined thereby, and at a second end to a first pivot point defined by the secondary support, and said secondary support being further pivotally joined to said primary support at said second pivot point defined thereby.

14. An articulated support as set forth in claim 13, wherein:
the locations of said pivot points defining the operation of said four-bar linkage are chosen such that varying the position of said primary support to accommodate different user positions correspondingly varies the preselected angular orientation of said secondary support with respect to said primary support.

15. An articulated support as set forth in claim 1, further comprising a lock for controllably retaining said primary support at a desired orientation with respect to said base.

16. An articulated support as set forth in claim 1, wherein said link is positioned so as to rotate said primary support at a predetermined synchronous rate with respect to the vertical translation of the forward portion of said primary support to achieve automatic adjustment of the display as the user shifts between different vertical positions.

17. An articulated support as set forth in claim 1, wherein said link is positioned so that the forward portion of said primary support moves in a generally vertical direction, so as to maintain optimum eye-to-display spacing between the display and the user as the user shifts between various vertical positions.

18. An articulated support as set forth in claim 17, wherein said link is positioned to translate the rearward portion of said primary support forwardly during said generally vertical movement of said forward portion of said primary support by an amount sufficient so as to avoid interference between the display and any vertical surface disposed adjacent the rearward portion of said base.

19. An articulated support as set forth in claim 1, wherein said link is shaped to permit said articulated support to assume a substantially flat condition when said primary support is shifted to its lowermost position.

20. An articulated support for computer displays, comprising:
a base adapted to be supported at a predetermined height, and including a fore-to-aft slide positioned adjacent a rearward portion of said base, and means defining a pivot point adjacent a forward portion of said base;
a primary support adapted for supporting a display thereon, and including a glide means positioned adjacent a rearward portion of said primary support and received within the slide of said base for fore-to-aft translation therealong while the primary support rotates about an axis generally parallel to the plane of said fore-to-aft translation, and a connector adapted for detachably supporting the display on said primary support adjacent a forward portion thereof such that the same move in unison;
a secondary support mounted to a forward portion of said primary support; and
linkage means for operatively connecting said primary support with said means defining a pivot point on said base, and said secondary support to said primary support, such that when the forward portion of said primary support is shifted upwardly to accommodate different user positions, the rearward portion of said primary support is translated forwardly to rotate said primary support and maintain user visibility of the display, and said secondary support moves in a predetermined arcuate path with respect to said primary support means.

21. The articulated support as defined in claim 20, further including a counterbalance assembly positioned between said base and said primary support to partially support said primary support in a selected position.

22. The articulated support as defined in claim 20, wherein said linkage means is a four-bar linkage defined by a a first link having one end pivotally coupled to said means defining a pivot point on said base and an opposite end pivotally connected to means defining a first pivot point on said primary support, means defining a second pivot point on the primary support, said first link defining a second pivot point, a second link pivoted at one end to the first link at said second pivot point defined thereby, and at a second end to a first pivot point defined by the secondary support, said secondary support being further pivotally joined to said primary support at said second pivot point defined thereby.

23. The articulated support as defined in claim 20, wherein said fore-to-aft slide includes a pair of track members positioned along opposite sides of said base for receiving paired glide members for parallel movement of said glide members therein.

24. The articulated support as defined in claim 20, wherein said primary support includes:
a deck disposed above said base;
a pair of glide members positioned along opposite sides of said deck, and received in opposed track members comprised by said fore-to-aft slide on said base; and
means extending laterally across a rearward portion of said deck for maintaining said pair of glide members in spaced parallel relationship to one another.

25. The articulated support as defined in claim 24, wherein said pair of track members each include a toothed rack disposed therein for engaging said toothed pinion glide members mounted on a common axle.

26. The articulated support as defined in claim 20, wherein said linkage means comprises means for rotating said secondary support at a predetermined synchronous rate with respect to vertical translation of a forward portion of said primary support to achieve automatic adjustment of the relationship between the primary and secondary supports as the primary support is shifted between different vertical positions.

27. The articulated support as defined in claim 20, wherein said linkage means is positioned to shift a forward portion of said primary support along a substantially vertical path during fore-to-aft translation of a rear portion thereof, so as to maintain optimum eye-to-display spacing between the display and the user as the user shifts between various vertical positions.

28. The articulated support as defined in claim 20, wherein during fore-to-aft translation of a rear portion thereof, said linkage means translates said rearward portion of said primary support forwardly an amount sufficient to avoid interference of the display with any vertical surface located adjacent said rearward portion of said base.

29. The articulated support as defined in claim 20, wherein said link is shaped to permit said primary support to assume a substantially flat condition when said primary support is fully retracted.

30. A desk top sit-stand support for computer displays and data input devices, comprising:

a base adapted to be supported on an existing work surface;

a primary support adapted for supporting a display thereon, said primary support being connected to said base by linkage means for providing adjustment of the relative angular orientation thereof, and a connector for detachably supporting the display on said primary support adjacent a forward portion thereof, such that the same move in unison between a sitting position wherein the display is oriented for convenient viewing by an adjacent seated user, and a standing position wherein the display is oriented for convenient viewing by an adjacent standing user;

a secondary support adapted for supporting a data input device thereon, and being supported by and operatively connected to said primary support for movement therewith between sitting and standing positions; and linkage means connecting said primary and secondary supports for cooperative movement thereof, such that as said primary support is shifted from the sitting position to the standing position with respect to said base, altering the relative angular orientation of the primary support and the display thereon with respect to said base, the relative angular position of said secondary support and the data input device thereon with respect to said primary support is controllably varied, so that as a user rotates said primary support to maintain user visibility of the display in a particular position the relative position of the secondary support is varied accordingly to maintain a desired orientation between the display and data input device.

31. The sit-stand support as defined in claim 30, wherein said linkage assembly comprises a four-bar linkage interconnecting said primary and secondary supports for maintaining a desired angular orientation therebetween.

32. The sit-stand support as defined in claim 30, further including a counterbalance assembly interconnecting said linkage assembly and said base to partially support said primary support in a selected orientation and to aid the user in articulating said primary support.

33. The sit-stand support as defined in claim 20, further including:

a pair of parallel channels attached to opposite sides of said base defining tracks for receiving wheels;

an axle mounted for rotation about an axis parallel to a rearward edge of said primary support and having wheels mounted on opposing ends of said axle, each wheel being received in a respective one of said channels permitting fore-to-aft translation of said primary support with respect to said base.

34. The sit-stand support as defined in claim 33, further including:

a toothed rack disposed in each of said channels; and wherein each said wheel comprises a toothed pinion attached to opposite ends of said axle, each pinion configured to engage said toothed rack to provide linear translation of said rearward portion of said primary support with respect to said base.

35. The sit-stand support as defined in claim 34, wherein said linkage assembly includes:

a primary link pivotally interconnecting said primary support to a pivot point defined on a forward portion of said base; and at least one secondary link pivotally interconnecting said primary link to said secondary support.

36. The sit-stand support as defined in claim 34, further including:

a brake assembly attached to said primary support and operatively connected to said axle for engaging and disengaging said axle in a lock and unlocked configuration; and a brake release control mechanism interconnected to said brake assembly by a control linkage.

37. An articulated support for computer display devices, comprising:

a base, including means for cooperating with an associated glide member for defining a fore-to-aft translation mechanism, positioned adjacent a rearward portion thereof and means defining a pivot point positioned adjacent a forward portion thereof;

a glide member for being positioned adjacent a rearward portion of a computer display device and received by said translation mechanism for fore-to-aft translation with respect to said base, said glide member permitting rotation of said display about an axis perpendicular to the direction of said fore-to-aft translation; and link means having one end thereof pivotally connected with said means defining a pivot point on said base, and an opposite end thereof pivotally connected with a second pivot point fixed with respect to said display at a location spaced apart from said glide member, such that when a forward portion of said display is shifted upwardly to accommodate different user positions, the rearward portion of said display is translated forwardly to rotate said display and maintain user visibility of the display.

38. The articulated support as defined in claim 37, further including counterbalance means interconnecting said link and said base for partially supporting said display in a selected angular orientation and to aid the user in repositioning said display.

39. The articulated support as defined in claim 38, further including means connected to said translation mechanism for selectively preventing translation of said glide member and fix a position of said display with respect to said base.

40. The articulated support as defined in claim 37, further including a secondary support adapted for supporting a data input device thereon and connected to said link means by further linkage means such that as said display device is adjusted to accommodate different vertical positions of the user by simultaneously translating and rotating the device with respect to the base, said linkage simultaneously changes the vertical position of said secondary support.

41. A support structure for a computer display, comprising:

a base, comprising at least three support points for supporting a primary support at three corresponding points, wherein at least one of said at least three support points on said base comprises means defining a fixed pivot point for an associated link, and at least one of said at least three support points on said base comprises means permitting fore-to-aft translation of an associated glide means on said primary support, a generally rectangular primary support having forward and rearward edges, comprising means for fixedly receiving said display, means forward of the rearward edge of said primary support defining at least one fixed pivot point for receiving an associated link, and at least one glide means on a rearward edge thereof cooperating with said means on said base for permitting fore-to-aft translation of said rearward edge of said primary support, while permitting rotation of said primary support about an axis generally parallel to the direction of said fore-to-aft translation, and a link, comprising means for maintaining two pivot points a fixed distance from one another, and mounted pivotally between said at least one fixed pivot point on each of said base and said primary support, whereby as said forward edge of said primary support is raised, said glide means slides forwardly along said means permitting fore-to-aft translation, such that said forward edge of said primary support rotates upwardly as its rearward edge moves forwardly.

42. The support structure of claim 41, further comprising counterweight means for supporting a portion of the weight of said primary support and display.

43. The support structure of claim 42, wherein said counterweight means comprises a compression member arranged to exert force between said base and said primary support so that said compression means is compressed as the forward edge of said primary support is lowered.

44. The support structure of claim 43, wherein said compression member is a compression spring.

45. The support structure of claim 44, further comprising means for adjusting the force exerted by said spring at any given point, so as to allow compensation for varying loads placed on said primary support.

46. The support structure of claim 45, wherein said means for adjusting the force exerted by said spring comprises threaded means for compressing said spring between end members capturing opposed ends of said spring, said end members applying force between said base and said link.

47. The support structure of claim 41, further comprising a secondary support pivotally connected to said primary support, and linkage controlling the relative angular positions of said first and second supports so that as the position of the primary support is altered with respect to the base, the position of the secondary support is altered correspondingly.

48. The support structure of claim 47, wherein said linkage controlling the relative angular positions of said first and second supports comprises a four-bar linkage.

49. The support structure of claim 41, wherein said four-bar linkage is defined by a second pivot point on the primary support, a second pivot point defined by said first link, a second link pivoted at one end to the first link at said second pivot point defined thereby, and at a second end to a first pivot point defined by the secondary support, and said secondary support being further pivotally joined to said primary support at said second pivot point defined thereby.

\* \* \* \* \*

UNITED STATES PATENT AND TRADEMARK OFFICE
CERTIFICATE OF CORRECTION

PATENT NO. : 5,765,797
DATED : June 16, 1998
INVENTOR(S) : H. Peter Greene and John J. Rizzi It is certified that error appears in the above-identified patent and that said Letters Patent is hereby corrected as shown below:

On the cover page , delete "Matthew J. Ransil, 317 Fairmount Ave., Apt. 112, Jamestown, N.Y. 14701."

Signed and Sealed this

First Day of September, 1998

Attest:

BRUCE LEHMAN

Attesting Officer

Commissioner of Patents and Trademarks